(12) United States Patent
Lim et al.

(10) Patent No.: US 7,576,706 B2
(45) Date of Patent: Aug. 18, 2009

(54) IMAGE DISPLAY DEVICE INCLUDING TWO DISPLAY PANELS AND METHOD OF MANUFACTURING THE SAME

(75) Inventors: Ji-Suk Lim, Daejeon (KR); Won-Kyu Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 780 days.

(21) Appl. No.: 10/857,302

(22) Filed: May 28, 2004

(65) Prior Publication Data
US 2005/0146486 A1 Jul. 7, 2005

(30) Foreign Application Priority Data
Jan. 7, 2004 (KR) ............... 10-2004-0000973

(51) Int. Cl.
G09G 5/00 (2006.01)
G01R 31/00 (2006.01)
H01L 21/28 (2006.01)
(52) U.S. Cl. .................. 345/1.3; 345/87; 345/103; 349/149; 349/150; 349/151; 349/152; 438/573; 438/605; 438/652; 324/770
(58) Field of Classification Search .......... 345/1.1–1.3, 345/87, 93, 103, 205, 206; 349/149–152; 438/573, 605, 652; 324/770
See application file for complete search history.

(56) References Cited

U.S. PATENT DOCUMENTS 6,519,021 B1 * 2/2003 Aruga .................. 349/152
6,954,184 B2 * 10/2005 Kurashima et al. .......... 345/1.3
7,167,141 B2 * 1/2007 Goto et al. ................ 345/1.1
2003/0063041 A1 4/2003 Kurashima et al.
2003/0210215 A1 * 11/2003 Takahashi .................. 345/87
2005/0253773 A1 * 11/2005 Sekiguchi ................. 345/1.1

FOREIGN PATENT DOCUMENTS

CN 1407527 A 1/2002
CN 1475838 A 7/2003

OTHER PUBLICATIONS

The Patent Office of the People's Republic of China; The First Office Action; 200410069844.8; Sep. 28, 2007.

* cited by examiner

Primary Examiner—Henry N Tran
(74) Attorney, Agent, or Firm—Cantor Colburn LLP

(57) ABSTRACT

An image display device includes a driving unit to provide first and second image signals and first and second control signals to display images, a first display unit to display first images in response to the first image signal and the first control signal from the driving unit, a second display unit to display secondary images in response to the second image signal and the second control signal from the driving unit, first data-transfer lines to transfer the second image signal from the driving unit to the second display unit, second data-transfer lines to transfer the second control signal from the driving unit to the second display unit, and a flexible printed circuit board connected between the first and second display units to provide electrical connection between the driving unit and the second display unit.

29 Claims, 12 Drawing Sheets

IMAGE DISPLAY DEVICE INCLUDING TWO DISPLAY PANELS AND METHOD OF MANUFACTURING THE SAME

BACKGROUND OF THE INVENTION

1. Field of the Invention

The present invention relates to a device for displaying images, and more particularly, to an image display device having multiple display panels and a method of manufacturing the same.

2. Description of the Related Art

Cellular phones generally have two types—flip type and folder type. Flip type cellular phones have an image display panel which is externally exposed, while folder type cellular phones have an image display panel which is configured to face a keypad with which a user operates a cellular phone. In a folder type cellular phone, the image display panel and the keypad panel are connected each other using a hinge so that they are foldable toward each other.

The folder type cellular phones also have two types—single panel type and dual panel type—in terms of the number of display panels in a cellular phone. A dual panel type cellular phone includes a main panel for displaying main images and a sub-panel for displaying sub-images, for example, time, date, receiving sensitivity, etc. In a dual panel type cellular phone, the main panel is not externally exposed while a user does not use the cellular phone. The main panel faces the keypad when the cellular phone is not operated. In contrast, the sub-panel is always exposed to the outside, so that a user is able to monitor the sub-images without unfolding the cellular phone.

In the conventional dual panel type cellular phones, the main and sub-panels each include a data driving chip generating a data signal and a gate driving chip generating a gate signal. Since a conventional dual panel type cellular phone has the data driving and gate driving chips in both the main and sub-panels, there have been problems such that it is difficult to reduce the size of a dual panel type cellular phone and to reduce the manufacturing time. Thus, there have been difficulties in improving productivity of the image display devices such as the dual panel type cellular phones.

Therefore, a need exists for an image display device which has multiple display panels and a single driving chip to drive the display panels. Accordingly, the overall size of the display device is reduced and productivity thereof is also improved.

BRIEF SUMMARY OF THE INVENTION

The above mentioned and other drawbacks and deficiencies of the prior art are overcome or alleviated by a display device according to the present invention. In one embodiment, an image display device includes a driving unit to provide first and second image signals and first and second control signals to display images, a first display unit to display first images in response to the first image signal and the first control signal provided from the driving unit, a second display unit to display secondary images in response to the second image signal and the second control signal provided from the driving unit, first data-transfer lines to transfer the second image signal from the driving unit to the second display unit, and second data-transfer lines to transfer the second control signal from the driving unit to the second display unit. The display device may also include a circuit board to provide electrical connection between the driving unit and the second display unit.

The first data-transfer lines may include a first data line group to transfer the first and second image signal received from the driving unit, a first connection line group to transfer the second image signal received from the first data line group, and a second data line group to receive the second image signal from the first connection line group, in which the second data line group is disposed in the second display unit. The first connection line group is disposed in the circuit board, and the first data line group is disposed in a first display area of the first display unit and transfers the first image signal to display the first images on the first display area. The second data line group is disposed in a second display area of the second display unit and transfers the second image signal to display the secondary images on the second display area.

The second data-transfer lines may include a second connection line group to transfer the second control signal received from the driving unit, and a third connection line group to transfer the second control signal received from the second connection line group to gate lines disposed in the second display unit. The third connection line group is disposed in the circuit board. The second connection line group is disposed in a peripheral area of the first display unit, in which the peripheral area of the first display unit surrounds the first display area of the first display unit and the first data line group is disposed in the first display area of the first display unit. The second connection line group has a single-layer structure, and gate lines disposed in the first display area of the first display unit has a double-layer structure.

The driving unit may include a controller to receive an original image signal including the first and second image signals and an original control signal that are externally provided, a memory device to store the original image signal provided from the controller, in which the controller reads the first and second image signals from the memory in response to the original control signal, a data driver to provide the first and second image signals to the first and second display units, respectively, a main driver to provide the first control signal to the first display unit in response to a main control signal from the controller, and a sub-driver to provide the second control signal to the second display unit in response to a sub-control signal from the controller.

In another embodiment, the driving unit may also include a common voltage generator to provide a common voltage signal to the first and second display units, and third data-transfer lines to transfer the common voltage signal to the second display unit. The third data-transfer lines may include a fourth connection line to transfer the common voltage signal provided from the common voltage generator, which is disposed in a peripheral area of the first display unit, a fifth connection line to transfer the common voltage signal received from the fourth connection line to the second display unit, which is disposed in the circuit board connected between the first and second display units, and a common voltage line to receive the common voltage signal from the fifth connection line, which is disposed in a peripheral area of the second display unit.

In further another embodiment, a method for manufacturing a display device includes forming a first metal layer on a substrate of a display panel in the display device, forming a second metal layer on the first metal layer, in which the first and second metal layers have a substantially identical thickness, patterning the first and second metal layers to form gate lines of the display panel, forming a gate insulating layer on the gate lines, forming a third metal layer on the gate insulating layer, and patterning the third metal layer to form data lines of the display panel.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Detailed illustrative embodiments of the present invention are disclosed herein. However, specific structural and functional details disclosed herein are merely representative for purposes of describing exemplary embodiments of the present invention.

Figure 1:
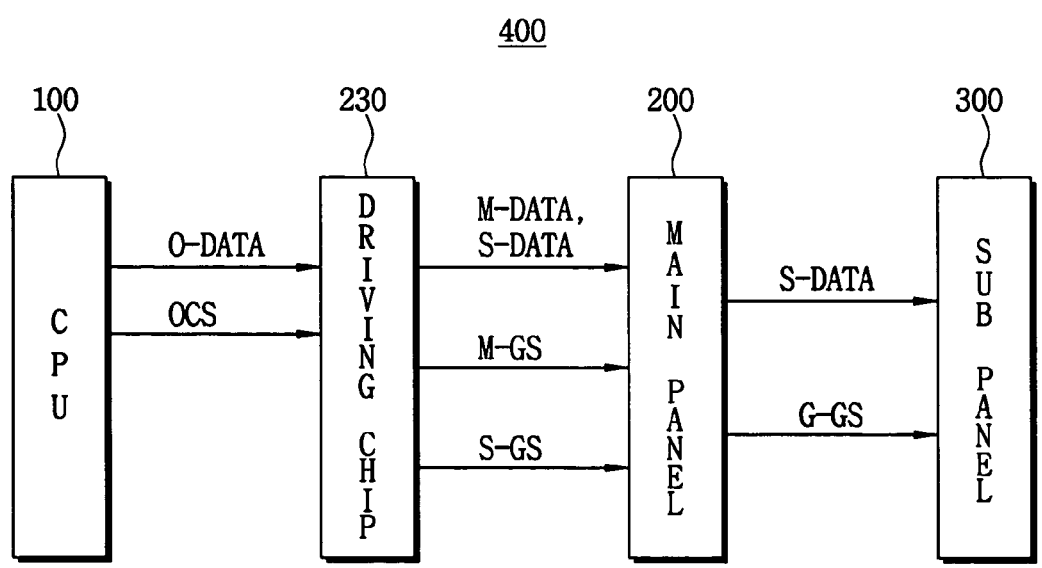
FIG. 1 is a block diagram illustrating a dual panel type liquid crystal display (LCD) device according to an exemplary embodiment of the present invention.

FIG. 1 is a block diagram illustrating a dual panel type liquid crystal display (LCD) device according to an exemplary embodiment of the present invention. Referring to FIG. 1, the dual panel type LCD device 400 includes a main panel 200 that displays main information, a sub-panel 300 that displays sub-information, and a driving chip 230 that drives the main and sub-panels 200 and 300.

The driving chip 230 receives an original image signal O-DATA and an original control signal OCS from an external device such as CPU of the dual panel type LCD device 400. The driving chip 230 outputs various signals, for example, a main image signal M-DATA, a sub-image signal S-DATA, a main gate signal M-GS, a sub-gate signal S-GS, etc., in response to the original image signal O-DATA and the original control signal OCS to drive the main and sub-panels 200 and 300.

The main panel 200 receives the main image signal M-DATA and the main gate signal M-GS from the driving chip 230 and displays main images. The sub-panel 300 receives the sub-image signal S-DATA and the sub-gate signal S-GS from the driving chip 230 and displays sub-images.

Figure 2:
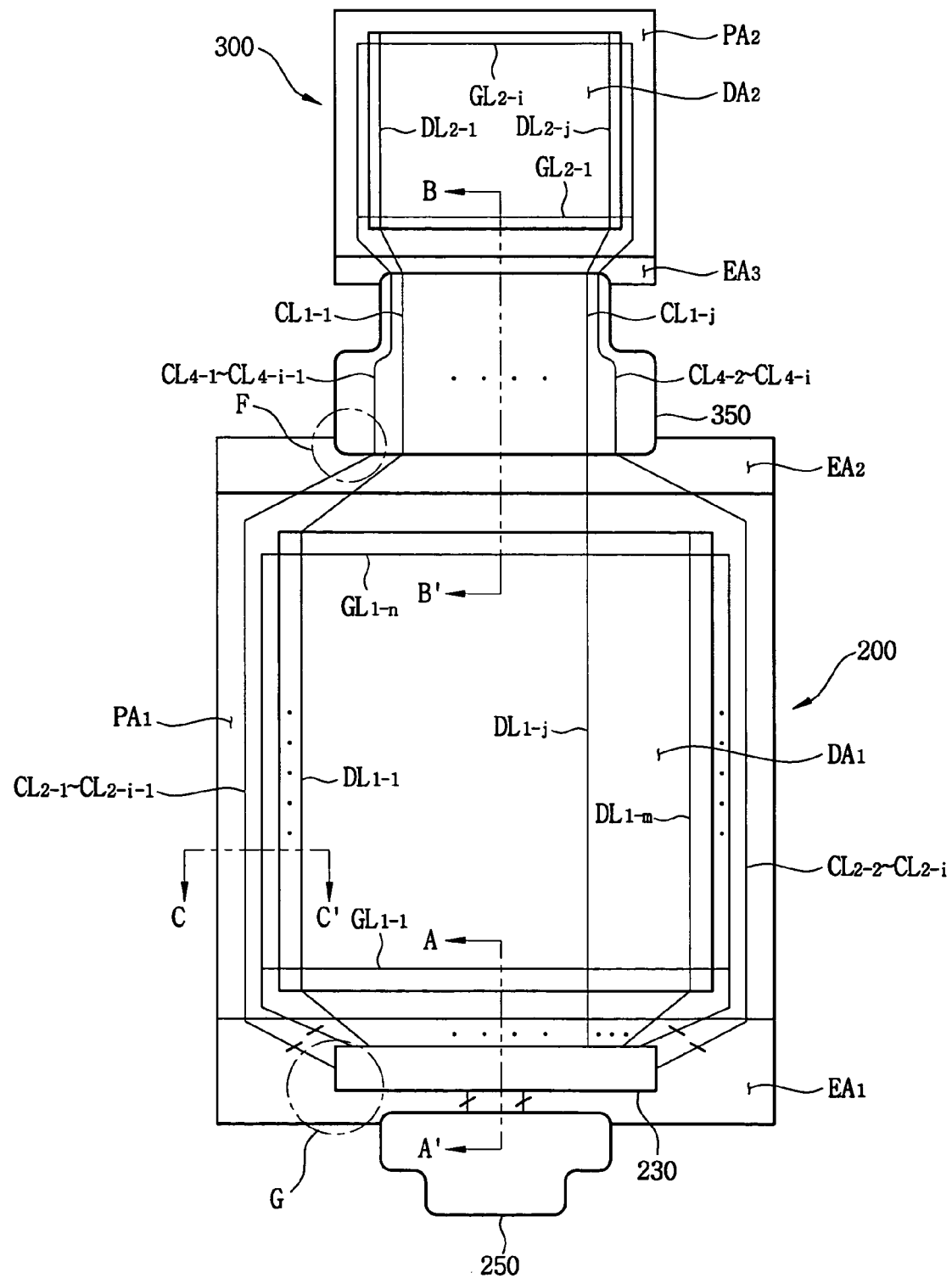
FIG. 2 is a schematic diagram illustrating signal lines and structure of the dual panel type LCD device in FIG. 1.
Figure 3A:
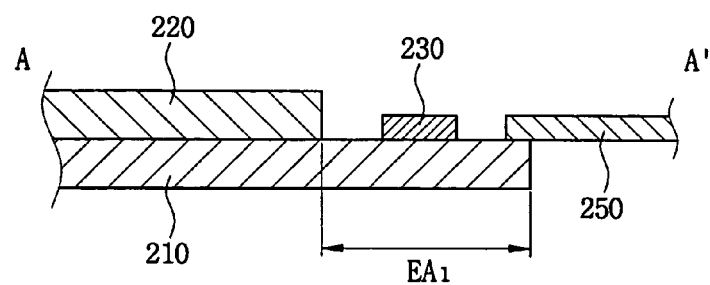
FIG. 3A is a cross-sectional view of the main panel taken along line A-A' in FIG. 2.
Figure 3B:
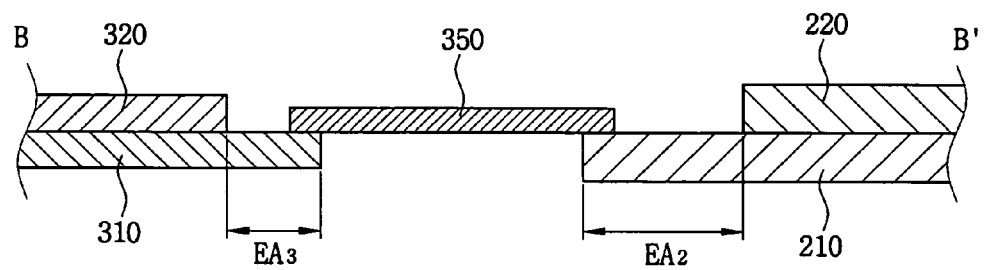
FIG. 3B is a cross-sectional view of the main panel taken along line B-B' in FIG. 2.

FIG. 2 is a schematic diagram illustrating signal lines and structure of the dual panel type LCD device in FIG. 1. FIG. 3A is a cross-sectional view of the main panel taken along line A-A' in FIG. 2. FIG. 3B is a cross-sectional view of the main panel taken along line B-B' in FIG. 2.

Referring to FIG. 2, the main panel 200 includes a first display area DA1 that displays the main images and a first peripheral area PA1 adjacent to the first display area DA1. Also, the sub-panel 300 includes a second display area DA2 that displays the sub-images and a second peripheral area PA2 adjacent to the second display area DA2. The first and second display areas DA1 and DA2 are, for example, disposed to be partially or fully surrounded with the first and second peripheral areas PA1 and PA2, respectively.

The first display area DA1 includes a first gate line group GL1-1~GL1-n having 'n' gate lines and a first data line group DL1-1~DL1-m having 'm' data lines. The gate lines of the first gate line group are substantially perpendicular to the data lines of the first data line group. Also, the second display area DA2 includes a second gate line group GL2-1~GL2-i having 'i' gate lines and a second data line group DL2-1~DL2-j having 'j' data lines. The gate lines of the second gate line group are also substantially perpendicular to the data lines of the second data line group. In this embodiment, 'i', 'j', 'm' and 'n' are each a natural number equal to or larger than '2', and 'i' is equal to or less than 'n' and 'j' is equal to or less than 'm'. Also, 'i', 'j', 'm' and 'n' are each an even number.

The main panel 200 has a size greater than that of the sub-panel 300, and thus the first display area DA1 has a size greater than that of the second display area DA2. Also, the first display area DA1 has a resolution higher than that of the second display area DA2. The first peripheral area PA1 of the main panel 200 includes a first engagement area EA1 and a second engagement area EA2. The second peripheral area PA2 of the sub-panel 300 includes a third engagement area EA3.

As shown in FIG. 3A, the main panel 200 includes a first lower substrate 210, a first upper substrate 220 facing the first lower substrate 210, and a first liquid crystal layer (not shown) disposed between the first lower substrate 210 and the first upper substrate 220. The first lower substrate 210 includes a first end portion corresponding to the first engagement area EA1. The first lower substrate 210 is extended beyond the end of the first upper substrate 220 to have the first end portion. For example, the first end portion of the lower substrate 210 is the substantially same as the first engagement area EA1.

The driving chip 230 is formed on the first engagement area EA1 to drive the main and sub-panels 200 and 300. A first flexible printed circuit board (FPC) 250 is disposed at the first engagement area EA1 such that it is connected to the first end portion of the lower substrate 210 to provide the original image signal O-DATA (shown in FIG. 1) and the original control signal OCS (shown in FIG. 1) from the CPU 100 (shown in FIG. 1) to the driving chip 230.

As shown in FIG. 3B, the first lower substrate 210 includes a second end portion extended beyond the other end of the first upper substrate 220. In this embodiment, the second end portion of the first lower substrate 210 corresponds to the second engagement area EA2 and may be the substantially same as the second engagement area EA2.

The sub-panel 300 includes a second lower substrate 310, a second upper substrate 320 facing the second lower substrate 310, and a second liquid crystal layer (not shown) disposed between the second lower substrate 310 and the second upper substrate 320. The second lower substrate 310 has an end portion corresponding to the third engagement area EA3. The second lower substrate 310 is extended beyond an end of the second upper substrate 320 to have the end portion corresponding to the third engagement area EA3. For example, the end portion of the second lower substrate 310 is the substantially same as the third engagement area EA3.

A second FPC 350 is disposed between the main and sub-panels 200 and 300 to connect the second engagement area EA2 of the main panel 200 and the third engagement area EA3 of the sub-panel 300. In other words, the second FPC 350 has first and second end portions respectively connected to the second and third engagement areas EA2 and EA3. Thus, the driving chip 230 and the sub-panel 300 are electrically connected to each other by means of the second FPC 350. Therefore, although the driving chip 230 is mounted on the first engagement area EA1 of the main panel 200, the driving chip 230 may drive the sub-panel 300.

Referring to FIG. 2 again, a first connection line group CL1-1~CL1-j is formed on the second FPC 350, thereby the first data line group DL1-1~DL1-m is electrically connected to the second data line group DL2-1~DL2-j via the first connection line group CL1-1~CL1-j.

The main panel 200 includes a second connection line group CL2-1~CL2-i-1 and a third connection line group CL2-2~CL2-i, which are electrically connected to the driving chip 230. The second and third connection line groups CL2-1~CL2-i-1 and CL2-2~CL2-i are formed in the first peripheral area PA1 of the main panel 200. Also, the second FPC 350 includes a fourth connection line group CL4-1~CL4-i-1 and a fifth connection line group CL4-2~CL4-i, so that the second and third connection line groups CL2-1~CL2-i-1 and CL2-2~CL2-i are electrically connected to the second gate line group GL2-1~GL2-i.

The sub-image signal S-DATA outputted from the driving chip 230 is transferred to the second data ling group DL2-1~DL2-j via the first data line group DL1-1~DL1-m and the first connection ling group CL1-1~CL1-j. Also, the sub-gate signal S-GS outputted from the driving chip 230 is transferred to the second gate line group GL2-1~GL2-i via the second, third, fourth and fifth connection line groups CL2-1~CL2-i-1, CL2-2~CL2-i, CL4-1~CL4-i-1, CL4-2~CL4-i.

Figure 4:
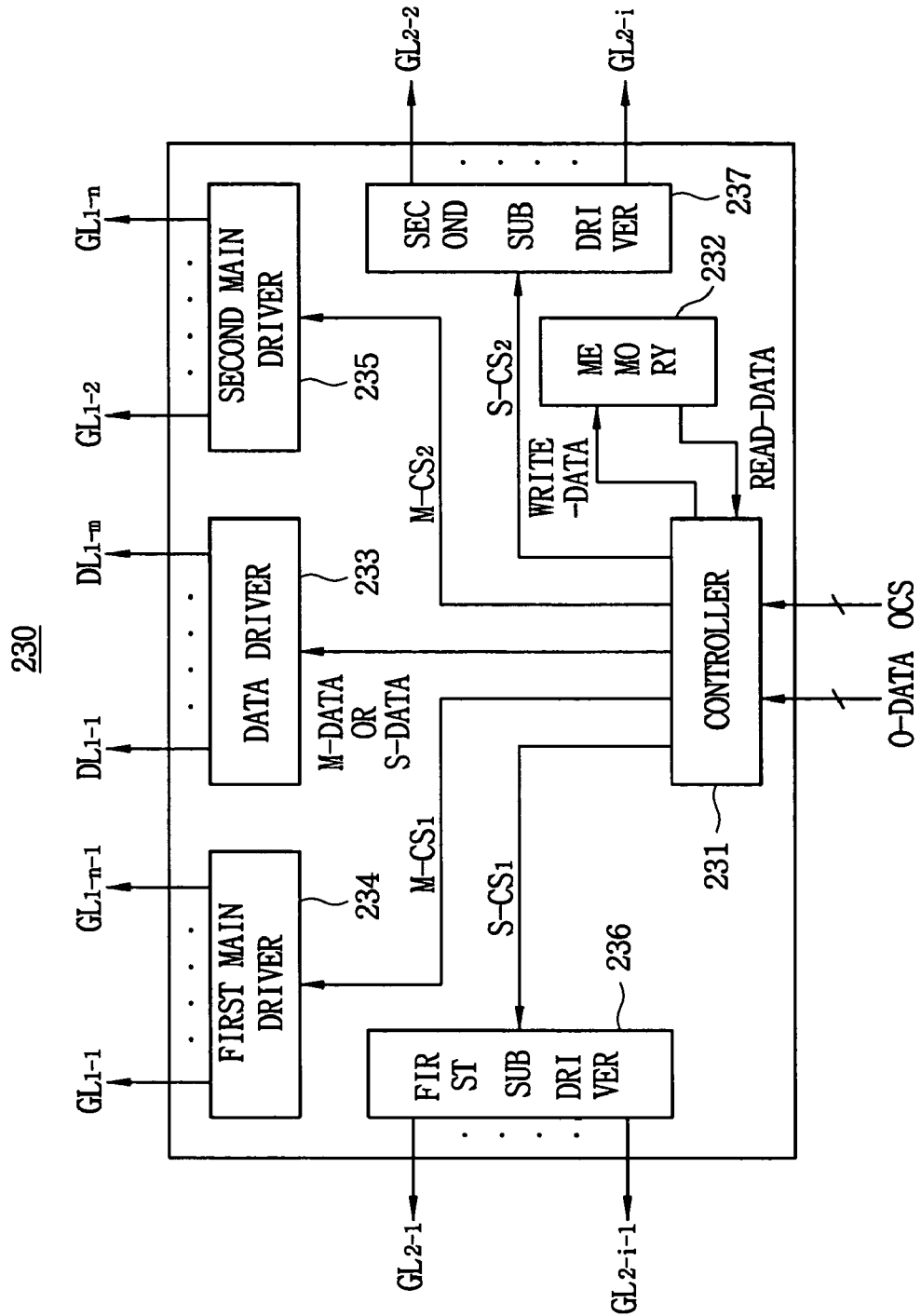
FIG. 4 is block diagram illustrating the driving chip in FIG. 2.

FIG. 4 is a block diagram illustrating the driving chip 230 in FIG. 2. Referring to FIG. 4, the driving chip 230 includes a controller 231, a memory 232, a data driver 233, a first main driver 234, a second main driver 235, a first sub-driver 236 and a second sub-driver 237.

The controller 231 receives the original image data O-DATA and the original control signal OCS which are externally provided, for example, a central processing unit. The controller 231 writes the original image data O-DATA into the memory 232 (WRITE-DATA). The controller 231 also reads out image data from the memory 232 (READ-DATA) in response to the original control signal OCS. For example, the image data is read out from the memory 232 line by line. The memory 232 has a main memory area and a sub-memory area, and the original image data O-DATA provided from the controller 231 is selectively written into the main memory area or the sub-memory area. In this case, main image data is stored in the main memory and sub-image data is stored in the sub-memory area.

In order to drive the main panel 200, the controller 231 provides the main image data M-DATA read from the main memory area of the memory 232 to the data driver 233. The data driver 233 outputs the main image data M-DATA to the first data line group DL1-1~DL1-m formed in the main panel 200.

The driving chip 230 also includes a driver for providing the main gate signal to the first gate line group GL1-1~GL1-n of the main panel 200 (referring to FIG. 2) in response to a control signal from the controller 231. For example, the first main driver 234 receives the first main control signal M-CS1 from the controller 231 and outputs the main gate signal M-GS (refer to FIG. 1) to a part of the first gate line group GL1-1~GL1-n-1. The second main driver 235 receives the second main control signal M-CS2 from the controller 231 and outputs the main gate signal M-GS (refer to FIG. 1) to the remaining part of the first gate line group GL1-2~GL1-n. In this embodiment, the part of the first gate line group GL1-1~GL1-n-1 are odd-numbered gate lines, and the remaining part of the first gate line group GL1-2~GL1-n are even-numbered gate lines.

In order to drive the sub-panel 300, the controller 231 provides the sub-image data S-DATA read from the sub-memory area of the memory to the data driver 233. Then, the data driver 233 outputs the sub-image data S-DATA to the second data line group DL2-1~DL2-j.

The driving chip 230 also includes a driver for providing the sub-gate signal to the second gate line group GL2-1~GL2-i of the sub-panel 300 (referring to FIG. 2) in response to a control signal from the controller 231. For example, the first sub-driver 236 receives the first sub-control signal S-CS1 from the controller 231 and outputs the sub-gate signal S-GS to a part of the second gate line group GL2-1~GL2-i-1. The second sub-driver 237 receives the second sub-control signal S-CS2 from the controller 231 and outputs the sub-gate signal S-GS to the remaining part of the second gate line group GL2-2~GL2-n. In this embodiment, the part of the second gate line group GL2-1~GL2-i-1 are odd-numbered gate lines, and the remaining part of the second gate line group GL2-2~GL2-i are even-numbered gate lines.

Figure 5:
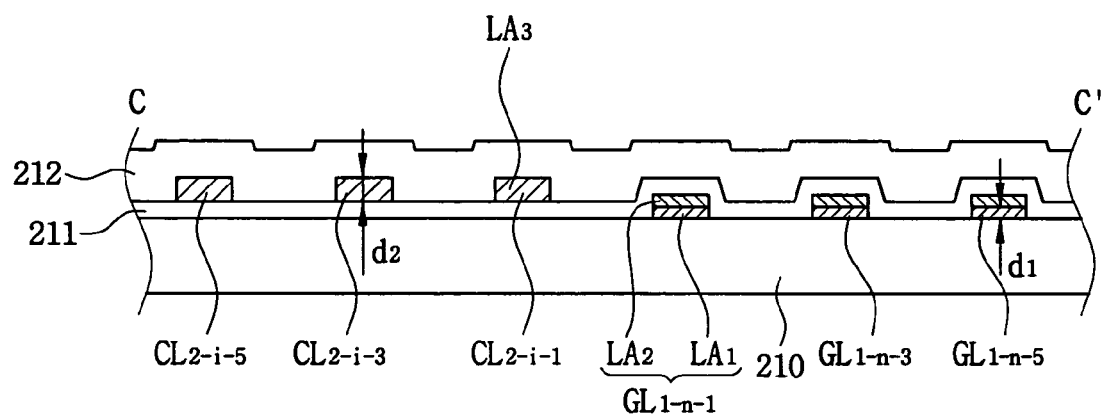
FIG. 5 is a cross-sectional of the main panel taken along line C-C' in FIG. 2.

FIG. 5 is a cross-sectional of the main panel taken along line C-C' in FIG. 2. Referring to FIG. 5, the first gate line group GL1-n-5, GL1-n-3 and GL1-n-1 and the second connection line group CL2-i-5, CL2-i-3 and CL2-i-1 are formed on the first lower substrate 210. The first gate line group GL1-n-5, GL1-n-3 and GL1-n-1 has a double-layer structure including a first metal layer LA1 and a second metal layer LA2 successively formed. The second connection line group CL2-i-5, CL2-i-3 and CL2-i-1 has a single-layer structure including a third metal layer LA3. In this embodiment, the first metal layer LA1 comprises chromium Cr or chromium alloy, the second metal layer LA2 comprises aluminum Al and aluminum alloy, and the third metal layer LA3 includes chromium Cr or chromium alloy.

The first gate line group GL1-n-5, GL1-n-3 and GL1-n-1 is formed on the first lower substrate 210, and a gate insulating layer 211 is formed on the first gate line group. The second connection line group CL2-i-5, CL2-i-3 and CL2-i-1 is disposed on the gate insulating layer 211. Then, a passivation layer 212 is formed on the second connection line group CL2-i-5, CL2-i-3 and CL2-i-1 and the gate insulating layer 211.

Generally, when two metal layers with different ionization characteristics are successively formed on a substrate and patterned to form a line, galvanic corrosion may occurs due to the different ionization characteristics between the two metal layers. In this embodiment, since the second connection line group CL2-i-5, CL2-i-3 and CL2-i-1 is formed on the first lower substrate 210 as the single-layer, the second connection line group CL2-i-5, CL2-i-3 and CL2-i-1 may be prevented from the galvanic corrosion.

The first, second and third metal layers each have a selected thickness to prevent substantial difference in electric resistance of the layers. For example, the first metal layer LA1 has a thickness d1 of about 1500 Å, and the third metal layer LA3 has a thickness d2 of about 2000 Å. Since the third metal layer LA3 is thicker than the first metal layer LA1 (or the second metal layer LA2), the second connection line group CL2-i-5, CL2-i-3 and CL2-i-i having the single-layer is prevented from having a line resistance substantially larger than that of the first gate line group GL1-n-5, GL1-n-3 and GL1-n-i having the double-layer structure.

Figure 6A:
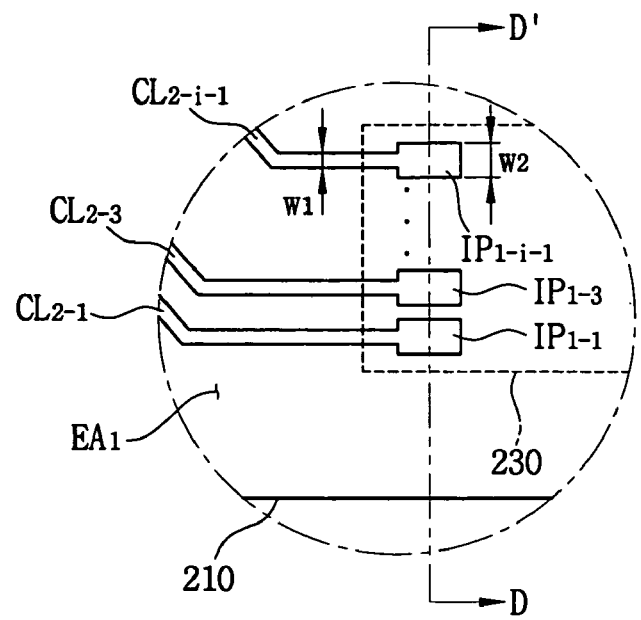
FIG. 6A is an enlarged view of portion G in FIG. 2.
Figure 6B:
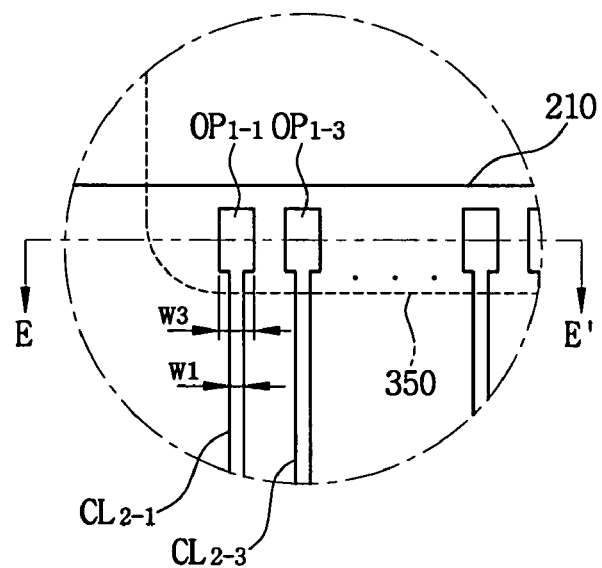
FIG. 6B is an enlarged view of portion F in FIG. 2.
Figure 7A:
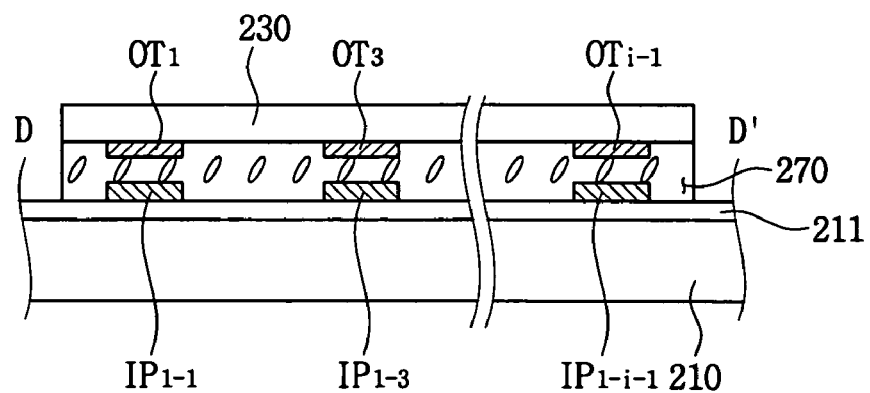
FIG. 7A is a cross-sectional view of the first engagement area taken along line D-D' in FIG. 6A.
Figure 7B:
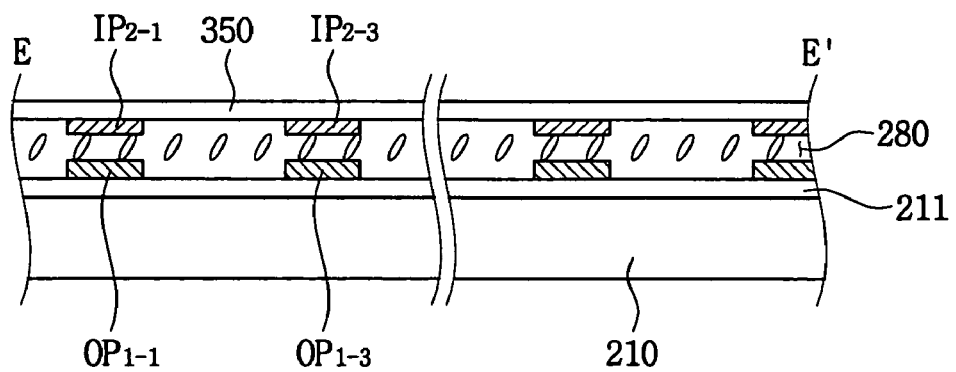
FIG. 7B is a cross-sectional view of the second engagement area taken along line E-E' in FIG. 6B.

FIG. 6A is an enlarged view of portion G in FIG. 2, and FIG. 6B is an enlarged view of portion F in FIG. 2. FIG. 7A is a cross-sectional view of the first engagement area taken along line D-D' in FIG. 6A, and FIG. 7B is a cross-sectional view of the second engagement area taken along line E-E' in FIG. 6B.

Referring to FIGS. 6A and 7A, the first engagement area EA1 includes input pads IP1-1~IP1-i-1 extended from the second connection line group CL2-1~CL2-i-1. The lines of the second connection line group each have a first width w1, and the input pads IP1-1~IP1-i-1 of the second connection line group each have a second width w2. In this embodiment, the second width w2 is larger than the first width w1.

The input pads IP1-1~IP1-i-1 of the second connection line group are electrically connected with output terminals OT1~OTi-1 of the driving chip 230 by means of an anisotropic conductive film 270 which is disposed between the driving chip 230 and the gate insulating layer 211. Thus, the sub-gate signal S-GS (refer to FIG. 1) outputted from the output terminals OT1~OTi-1 of the driving chip 230 is provided to the input pads of the second connection line group CL2-1~CL2-i-1.

In this embodiment, the input pads IP1-1~IP1-i-1 of the second connection line group have the single-layer structure as the lines of the second connection line group CL2-1~CL2-i-1. Generally, when pads, like the input pads of the second connection line group, extended from lines and receiving signals externally provided are exposed, humidity easily infiltrates into the pads. The humidity infiltrated into the pads accelerates the galvanic corrosion of the pads. In this embodiment, since the input pads IP-1~IP1-i-1 of the second connection line group have the single-layer structure, the inputs pads IP-1~IP1-i-1 are prevented from the galvanic corrosion.

It should be noted that although the above description of the first engagement area EA1 is made with respect to one portion (i.e., portion G in FIG. 2) of the first engagement area EA1, it applies to the entire area of the first engagement area EA1.

Referring to FIGS. 6B and 7B, the second engagement area EA2 includes output pads (OP1-1, OP1-3, . . . ) of the second connection line group (CL2-1, CL2-3, . . . ). The output pads are extended from the end of the second connection line group, which is opposite to the end from which the input pads are extended. The first output pads of the second connection line group each have a third width w3 that is larger than the first width w1 of the lines of the second connection line group (CL2-1, CL2-3, . . . ).

The second FPC 350 includes input pads (IP2-1, IP2-3, . . . ) extended from ends of the fourth connection line group CL4-1~CL4-i-1. An anisotropic conductive film 280 is disposed between the first lower substrate 210 (or the gate insulating layer 211) and the second FPC 350. The anisotropic conductive film 270 electrically connects the output pads of the second connection line group with the input pads of the second FPC 350 in the second engagement area EA2.

Thus, the sub-gate signal S-GS provided to the second connection ling group CL2-1~CL2-i-1 is applied to the input pads (IP2-1, IP2-3, . . . ) of the second FPC 350 through the output pads (OP1-1, OP1-3, . . . ) of the second connection line group. In this embodiment, the output pads (OP1-1, OP1-3, . . . ) of the second connection line group have the single-layer structure as the lines of the second connection line group, so that the output pads of the second connection line group is prevented from the galvanic corrosion.

Figure 8:
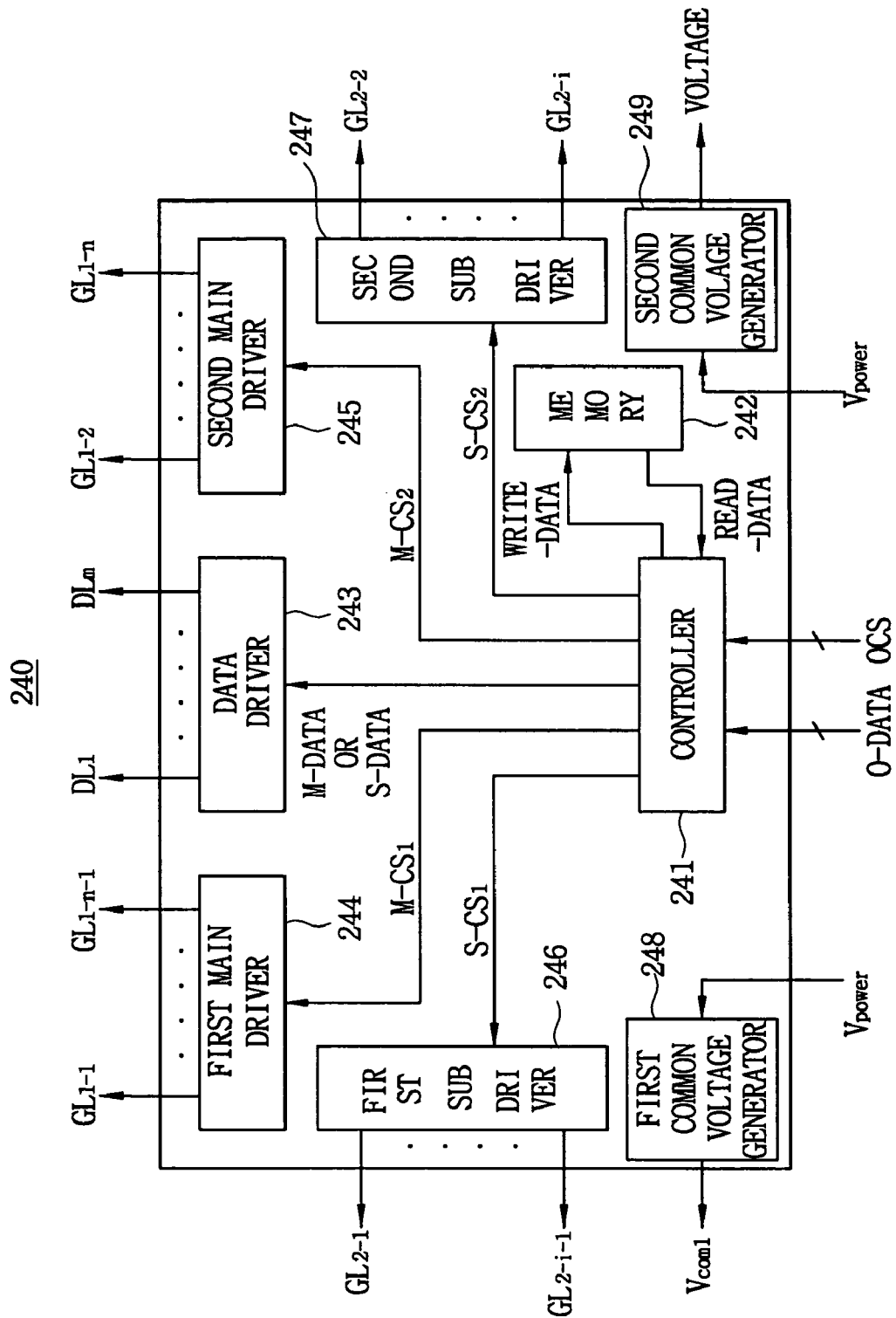
FIG. 8 is a block diagram illustrating a driving chip according to another exemplary embodiment of the present invention.

FIG. 8 is a block diagram illustrating a driving chip according to another exemplary embodiment of the present invention. Referring to FIG. 8, the driving chip 240 includes a controller 241, a memory 242, a data driver 243, a first main driver 244, a second main driver 245, a first sub-driver 246, a second sub-driver 247, a first common voltage generator 248 and a second common voltage generator 249. In this embodiment, the controller 241, the memory 242, the data driver 243, the first and second main drivers 244 and 245, and the first and second sub-drivers 246 and 247 are the substantially same as those of the driving chip in FIG. 4. Thus, the description thereof is omitted to avoid redundant duplication.

The first common voltage generator 248 receives a power voltage Vp externally provided, and adjusts a voltage level of the power voltage Vp to output a first common voltage Vcom1. The second common voltage generator 249 receives the power voltage Vp externally provided, and adjusts the voltage level of the power voltage Vp to output a second common voltage Vcom2. The first and second common voltages Vcom1 and Vcom2 are provided to the main panel and the sub-panel, respectively.

Figure 9:
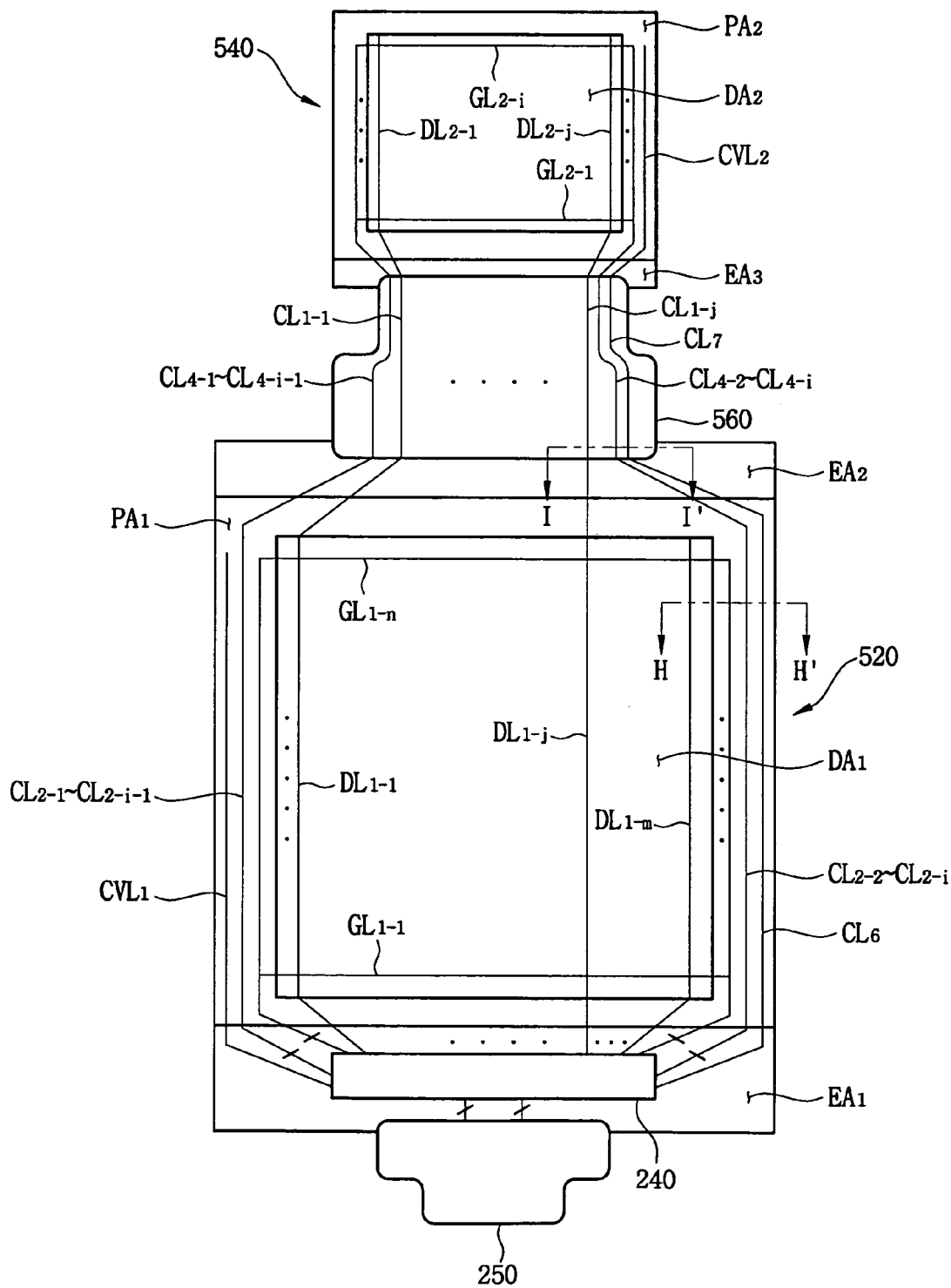
FIG. 9 is a schematic diagram illustrating a dual panel type LCD device having the driving chip in FIG. 8.
Figure 10A:
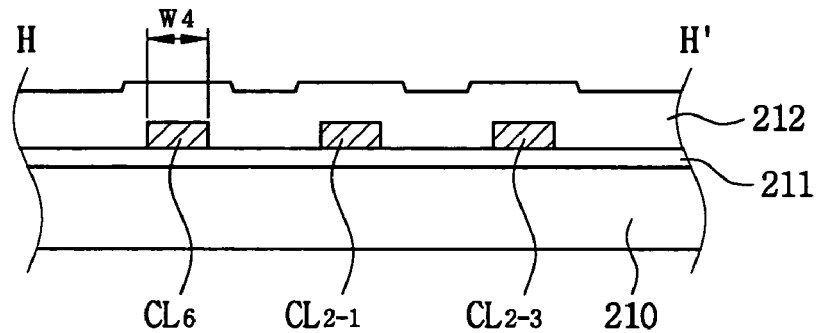
FIG. 10A is a cross-sectional view of the main panel taken along line H-H' in FIG. 9.
Figure 10B:
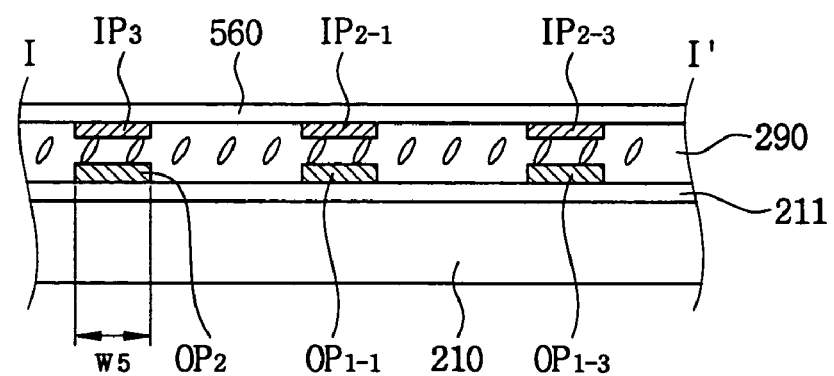
FIG. 10B is a cross-sectional view of the second engagement area taken along line I-I' in FIG. 9.

FIG. 9 is a schematic diagram illustrating a dual panel type LCD device having the driving chip in FIG. 8. FIG. 10A is a cross-sectional view of a first peripheral area taken along line H-H' in FIG. 9. FIG. 10B is a cross-sectional view of a second engagement area taken along line I-I' in FIG. 9.

Referring to FIG. 9, the dual panel type LCD device 500 includes a main panel 520 for displaying main images and a sub-panel 540 for displaying sub-images. The main panel 520 includes a first common voltage line CVL1 to which the first common voltage Vcom1 is applied, and the sub-panel 540 includes a second common voltage line CVL2 to which the second common voltage Vcom2 is applied.

The main panel 520 includes a sixth connection line CL6 that is electrically connected to the driving chip 240 so as to receive the second common voltage Vcom2. The second FPC 560 includes a seventh connection line CL7 that is electrically connected between the sixth connection line CL6 and the second common voltage line CVL2. Thus, the second common voltage Vcom2 outputted from the driving chip 240 is applied to the second common voltage line CLV2 through the sixth and seventh connection lines CL6 and CL7.

As shown in FIG. 10A, the sixth connection line CL6 has the single-layer structure as the lines of the second and third connection line groups CL2-1~CL2-i-1 and CL2-2~CL2-i (referring to FIG. 5), so that the sixth connection line CL6 is prevented from the galvanic corrosion.

As shown in FIG. 10B, the second engagement area EA2 further includes an output pad OP2 extended from an end of the sixth connection line CL6. The sixth connection line CL6 has a fourth width w4, and the output pad OP2 of the sixth connection line CL6 has a fifth width w5. In this embodiment, the fifth width w5 of the output pad OP2 is larger than the fourth width w4 of the sixth connection line CL6.

The second FPC 560 includes first input pads IP2-1, IP2-3 extended from the fourth connection line group and a second input pad IP3 extended from the seventh connection line CL7. The first input pads IP2-1, IP2-3 and the second input pad IP3 are disposed corresponding to the output pads OP1-1, OP1-3 of the second connection line CL2 and the output pad OP2 of the sixth connection line CL6, respectively.

An anisotropic conductive film 290 is disposed between the first lower substrate 210 (or the gate insulating layer 211) and the second FPC 560, and the output pad OP2 of the sixth connection line CL6 and the second input pad IP3 of the second FPC 560 are electrically connected to each other via the anisotropic conductive film 290. In this embodiment, since output pad OP2 of the sixth connection line CL6 has the single-layer structure, the output pad OP2 is prevented from the galvanic corrosion. Accordingly, the second input pad IP3 of the second FPC 560 is also prevented from the galvanic corrosion because humidity infiltrated into the second pad OP2 may not cause the galvanic corrosion with respect to the second input pad IP3.

Although not shown in FIGS. 10A and 10B, the first common voltage line CVL1 shown in FIG. 9 also has the single-layer structure.

Figure 11A:
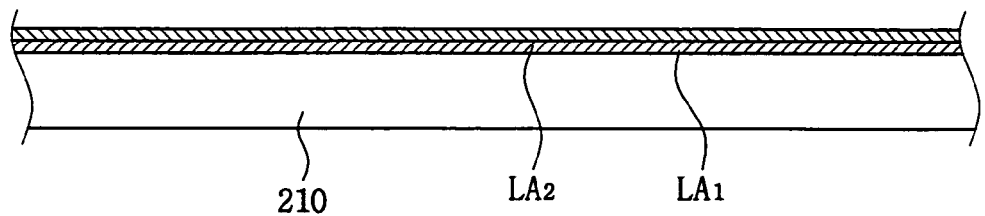
FIGS. 11A to 11E are schematic diagrams illustrating a method of manufacturing the main panel shown in FIG. 5.

FIGS. 11A to 11E are schematic diagrams illustrating a method of manufacturing the main panel shown in FIG. 5. Referring to FIG. 11A, the first metal layer LA1 having chromium or chromium alloy is formed on the first lower substrate 210, and a second metal layer LA2 having aluminum or aluminum alloy is formed on the first metal layer LA1.

Figure 11B:
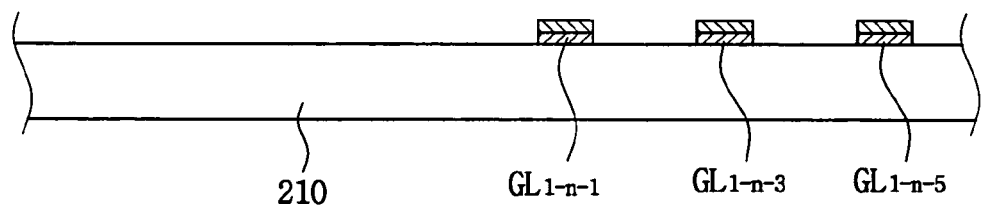
Figure 11C:
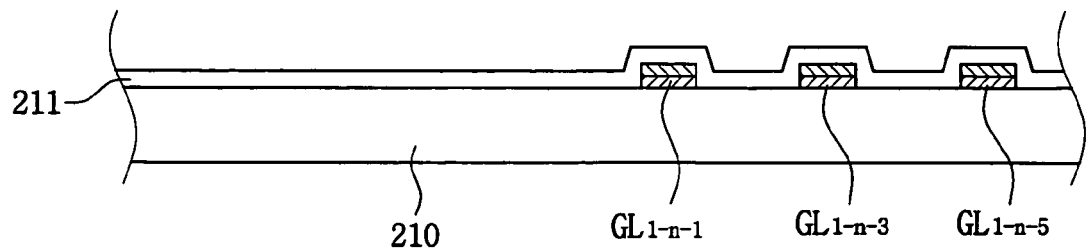

As shown in FIG. 11B, the first and second metal layers LA1 and LA2 are successively patterned to form the first gate line group GL1-n-5, GL1-n-3 and GL1-n-1 on the first lower substrate 210. Referring to FIG. 11C, the gate insulating layer 211 including silicon nitride SiNx or silicon oxide SiOx is formed on the first lower substrate 210 and the first gate line group GL1-n-5, GL1-n-3 and GL1-n-1.

Figure 11D:
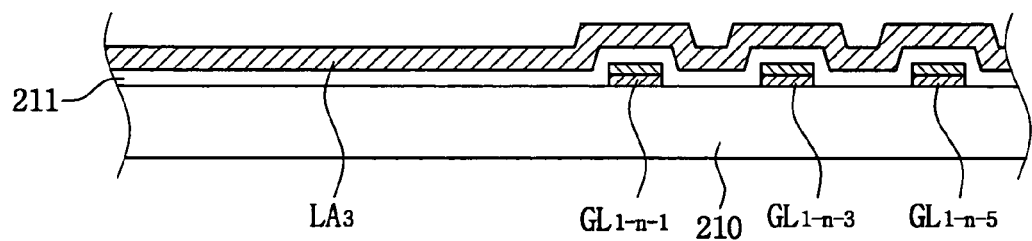
Figure 11E:
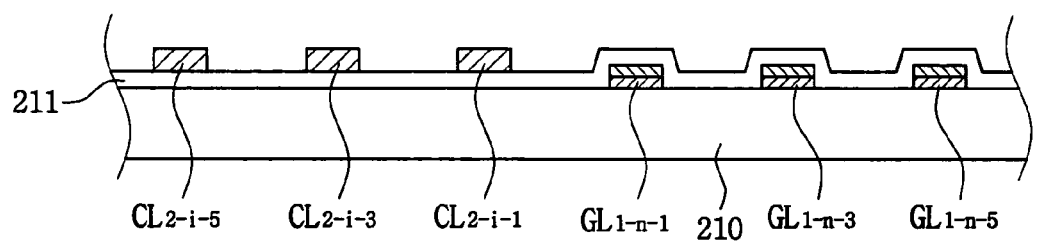

As shown in FIGS. 11D and 11E, the third metal layer LA3 is formed on the gate insulating layer 211. Then, the third metal layer LA3 is patterned to form the first data line group (not shown) and the second connection line group CL2-i-5, CL2-i-3 and CL2-i-1 on the gate insulating layer 211.

Referring to FIG. 5 again, the gate insulating layer 211, the first data line group DL1-1~DL1-m and the second connection light group CL2-i-5, CL2-i-3 and CL2-i-1 are covered by the passivation layer 212.

According to the display device and the method of manufacturing the same of the present invention, the main panel receives the main driving signal and the sub-driving signal externally provided, and provides the sub-driving signal to the sub-panel electrically connected thereto. The main panel includes connection lines having the single-layer structure to electrically connect the main and sub-panels to each other. The display device may prevent the galvanic corrosion that otherwise would be incurred in the connection lines, thereby enhancing the productivity thereof.

Also, the connection lines of the single-layer structure have a thickness larger than that of the connection lines of the double-layer structure, thereby reducing the line resistance of the connection lines and preventing delay of signals applied to the sub-panel through the connection lines.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device for displaying images, comprising:
a driving unit to provide first and second image signals and first and second control signals to display the images;
a first display unit to display first images in response to the first image signal and the first control signal provided from the driving unit;
a second display unit to display secondary images in response to the second image signal and the second control signal provided from the driving unit;
first data-transfer lines to transfer the second image signal from the driving unit to the second display unit; and
second data-transfer lines to transfer the second control signal from the driving unit to the second display unit,
wherein the first data-transfer lines include a first data line group formed on the first display unit, a first connection line group and a second data line group formed on the second display unit, and
wherein the first display unit includes gate lines disposed in the first display area of the first display unit, the gate lines of the first display unit having a multiple-layered structure formed on the substrate of the first display unit.

2. The display device of claim 1, further including a circuit board to provide electrical connection between the driving unit and the second display unit.

3. The display device of claim 2, wherein the circuit board is a flexible printed circuit board connected between the first and second display units.

4. The display device of claim 2, wherein the second data line group is disposed in a second display area of the second display unit, the second data line group transferring the second image signal to display the secondary images on the second display area.

5. The display device of claim 2, wherein the first connection line group is disposed in the circuit board.

6. The display device of claim 2, wherein the first data line group is disposed in a first display area of the first display unit, the first data line group transferring the first image signal to display the first images on the first display area.

7. The display device of claim 6, wherein the second data-transfer lines include:
a second connection line group to transfer the second control signal received from the driving unit; and
a third connection line group to transfer the second control signal received from the second connection line group to gate lines disposed in the second display unit.

8. The display device of claim 7, wherein the third connection line group is disposed in the circuit board.

9. The display device of claim 7, wherein the second connection line group is disposed in a peripheral area of the first display unit, the peripheral area of the first display unit surrounding the first display area of the first display unit, the first data line group being disposed in the first display area of the first display unit.

10. The display device of claim 7, wherein the second connection line group has a single-layer structure formed on a substrate of the first display unit.

11. The display device of claim 7, wherein the second connection line group includes a plurality of connection lines each having an input pad that is electrically connected with corresponding one of output terminals of the driving unit, the connection lines each having a first width and the input pad having a second width, the second width being larger than the first width.

12. The display device of claim 11, wherein the output terminals each include an output pad electrically connected with the input pad of the second connection line group, the output terminals each having a third width and the output pad having a fourth width, the fourth width being larger than the third width.

13. The display device of claim 12, wherein the first display unit further includes a first electrically conductive layer disposed between the input pads of the second connection line group and the output pads of the driving unit, each of the input pads of the second connection line group being aligned with corresponding one of the output pads of the driving unit so that each pair of the input pad and the output pad aligned each other having electrical conduction with each other through the first electrically conductive layer.

14. The display device of claim 11, wherein the connection lines of the second connection line group each include an output pad that is electrically connected with corresponding one of input pads of the third connection line group.

15. The display device of claim 14, wherein the first display unit further includes a second electrically conductive layer disposed between the output pads of the second connection line group and the input pads of the third connection line group, each of the output pads of the second connection line group being aligned with corresponding one of the input pads of the third connection line group so that each pair of the output pad of the second connection line group and the input pad of the third connection line group aligned each other having electrical conduction with each other through the second electrically conductive layer.

16. The display device of claim 2, wherein the first display unit has a first substrate and a second substrate facing each other and the second display unit has a third substrate and a fourth substrate facing each other, the first substrate having a first end portion extended beyond the first end of the second substrate and the second end portion extended beyond the second end of the second substrate, the third substrate having first end portion extended beyond a first end of the fourth substrate, wherein the driving unit is disposed on the first end portion of the first substrate and the circuit board is disposed between the first and third substrates such that opposite edges of the circuit board are connected with the first end portion of the first substrate and the first end portion the third substrate, respectively.

17. The display device of claim 2, wherein the driving unit includes:
 a controller to receive an original image signal including the first and second image signals and an original control signal that are externally provided;
 a memory device to store the original image signal provided from the controller, the controller reading the first and second image signals from the memory in response to the original control signal;
 a data driver to provide the first and second image signals to the first and second display units, respectively;
 a main driver to provide the first control signal to the first display unit in response to a main control signal from the controller; and
 a sub-driver to provide the second control signal to the second display unit in response to a sub-control signal from the controller.

18. The display device of claim 17, wherein the main driver includes:
 a first main-drive unit to provide the first control signal to a first part of gate lines disposed in the first display unit, the first part of the gate lines being odd-numbered ones of the gate lines in the first display unit; and
 a second main- drive unit to provide the first control signal to a second part of the gate lines disposed in the first display unit, the second part of the gate lines being even-numbered ones of the gate lines in the first display unit.

19. The display device of claim 17, wherein the sub-driver includes:
 a first sub-drive unit to provide the second control signal to a first part of gate lines disposed in the second display unit, the first part of the gate lines being odd-numbered ones of the gate lines in the second display unit; and
 a second sub-drive unit to provide the second control signal to a second part of the gate lines disposed in the second display unit, the second part of the gate lines being even-numbered ones of the gate lines in the second display unit.

20. The display device of claim 17, wherein the driving unit further includes a common voltage generator to provide a common voltage signal to the first and second display units.

21. The display device of claim 20, further including third data-transfer lines to transfer the common voltage signal to the second display unit, the third data-transfer lines include:
 a fourth connection line to transfer the common voltage signal provided from the common voltage generator, the fourth connection line being disposed in a peripheral area of the first display unit;
 a fifth connection line to transfer the common voltage signal received from the fourth connection line to the second display unit, the fifth connection line being disposed in the circuit board connected between the first and second display units; and
 a common voltage line to receive the common voltage signal from the fifth connection line, the common voltage line being disposed in a peripheral area of the second display unit.

22. The display device of claim 21, wherein the fourth connection line has an output pad formed on a substrate of the first display unit, the output pad of the fourth connection line being connected with an input pad connected to the fifth connection line, an electrically conductive layer being disposed between the output pad of the fourth connection line and the input pad of the fifth connection line.

23. A display device for displaying images, comprising: a driving unit to provide first and second image signals and first and second control signals to display the images;
 a first display unit to display first images in response to the first image signal and the first control signal provided from the driving unit;
 a second display unit to display secondary images in response to the second image signal and the second control signal provided from the driving unit;
 first data-transfer lines to transfer the second image signal from the driving unit to the second display unit;
 second data-transfer lines to transfer the second control signal from the driving unit to the second display unit; and
 a circuit board to provide electrical connection between the driving unit and the second display unit,
 wherein the first data-transfer lines include a first data line group to transfer the first and second image signal received from the driving unit, a first connection line group to transfer the second image signal received from the first data line group, and a second data line group to receive the second image signal from the first connection line group, the second data line group being disposed in the second display unit,
 wherein the first data line group is disposed in a first display area of the first display unit, the first data line group transferring the first image signal to display the first images on the first display area,
 wherein the second data-transfer lines include a second connection line group to transfer the second control signal received from the driving unit, and a third connection line group to transfer the second control signal received from the second connection line group to gate lines disposed in the second display unit, wherein the second connection line group has a single-layer structure formed on a substrate of the first display unit, and wherein the first display unit includes gate lines disposed in the first display area of the first display unit, the gate lines of the first display unit having a double-layer structure formed on the substrate of the first display unit.

24. The display device of claim 23, wherein the gate lines of the first display unit each include first and second layers one of which is stacked on the other, the second connection line group having a third layer formed on the substrate of the first display unit.

25. The display device of claim 24, wherein the first and second layers have a first thickness and the third layer has a second thickness, the first thickness being smaller than the second thickness.

26. The display device of claim 24, wherein the first display unit further includes a gate insulating layer formed on the substrate and the gate lines of the first display unit, the second connection line group being formed on the gate insulating layer.

27. The display device of claim 26, wherein the first display unit further includes a passivation layer formed on the gate insulating layer and the second connection line group.

28. A display device for displaying images, comprising:
a driving unit to provide first and second image signals and first and second control signals to display the images;
a first display unit to display first images in response to the first image signal and the first control signal provided from the driving unit;
a second display unit to display secondary images in response to the second image signal and the second control signal provided from the driving unit;
first data-transfer lines to transfer the second image signal from the driving unit to the second display unit; and
second data-transfer lines to transfer the second control signal from the driving unit to the second display unit;
wherein the first data-transfer lines include a first data line group formed on the first display unit, a first connection line group and a second data line group formed on the second display unit, and the second data-transfer lines include a second connection line group formed on the first display unit, and the first data line group and the second connection line group are formed in a same layer.

29. The display device of claim 28, wherein the first data line group and the second connection line group are made of data metal.

* * * * *

UNITED STATES PATENT AND TRADEMARK OFFICE
CERTIFICATE OF CORRECTION

PATENT NO. : 7,576,706 B2
APPLICATION NO. : 10/857302
DATED : August 18, 2009
INVENTOR(S) : Lim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1102 days.

Signed and Sealed this

Seventh Day of September, 2010

David J. Kappos
*Director of the United States Patent and Trademark Office*